United States Patent
Haug et al.

(10) Patent No.: US 6,292,771 B1
(45) Date of Patent: Sep. 18, 2001

(54) PROBABILISTIC METHOD FOR NATURAL LANGUAGE PROCESSING AND FOR ENCODING FREE-TEXT DATA INTO A MEDICAL DATABASE BY UTILIZING A BAYESIAN NETWORK TO PERFORM SPELL CHECKING OF WORDS

(75) Inventors: Peter J. Haug; Spencer B. Koehler; Lee M. Christensen, all of Salt Lake City; Michael L. Gundersen, Holladay; Rudy E. Van Bree, Kaysville, all of UT (US)

(73) Assignee: IHC Health Services, Inc., Salt Lake City, UT (US)

(*) Notice: Subject to any disclaimer, the term of this patent is extended or adjusted under 35 U.S.C. 154(b) by 0 days.

(21) Appl. No.: 09/164,048

(22) Filed: Sep. 30, 1998

Related U.S. Application Data

(60) Provisional application No. 60/060,567, filed on Sep. 30, 1997.

(51) Int. Cl.[7] .................. G06F 17/27; G06F 17/21; G06F 17/40
(52) U.S. Cl. ...................... 704/9; 707/533
(58) Field of Search .................. 704/9, 1, 10, 251, 704/255, 256, 257; 705/2, 3, 4

(56) References Cited

U.S. PATENT DOCUMENTS

| | | | | |
|---|---|---|---|---|
| 5,541,836 | * | 7/1996 | Church et al. | 704/7 |
| 5,594,638 | * | 1/1997 | Iliff | 705/3 |
| 5,659,771 | * | 8/1997 | Golding | 707/533 |
| 5,680,511 | * | 10/1997 | Baker et al. | 704/257 |
| 5,809,476 | * | 9/1998 | Ryan | 705/2 |
| 6,055,494 | * | 4/2000 | Friedman | 704/9 |

OTHER PUBLICATIONS

Friedman, et al., "Natural Language Processing in an Operational Clinical Information System", Natural Language Engineering, vol. 1(1), pp. 83–108, May 1995.*

Gundersen et al., Development and Evaluation of a Computerized Admission Diagnoses Encoding System, 1996, pp. 351–372.

Haug et al., A Natural Language Understanding System Combining Syntactic and Semanitic Techniques, 1994, pp. 247–251.

Haug et al., Experience with a Mixed Semantic/Syntactic Parser, 1995, pp. 284–288.

* cited by examiner

Primary Examiner—Joseph Thomas
(74) Attorney, Agent, or Firm—Lloyd W. Sadler

(57) ABSTRACT

A natural language understanding system is described which provides for the generation of concept codes from free-text medical data. A probabilistic model of lexical semantics, in the preferred embodiment of the invention implemented by means of a Bayesian network, is used to determine the most probable concept or meaning associated with a sentence or phrase. The inventive method and system includes the steps of checking for synonyms, checking spelling, performing syntactic parsing, transforming text to its "deep" or semantic form, and performing a semantic analysis based on a probabilistic model of lexical semantics. In the preferred embodiment of the invention, spell checking and transformational processing as well as semantic analysis make use of semantic probabilistic determinations.

2 Claims, 7 Drawing Sheets

PROBABILISTIC METHOD FOR NATURAL LANGUAGE PROCESSING AND FOR ENCODING FREE-TEXT DATA INTO A MEDICAL DATABASE BY UTILIZING A BAYESIAN NETWORK TO PERFORM SPELL CHECKING OF WORDS

This application is based on a Provisional Application Ser. No. 60/060,567, which was filed on Sep. 30, 1997, and priority is claimed thereto.

BACKGROUND OF THE INVENTION

1. Field of the Invention.

The present invention relates to the field of natural language understanding, and more particularly to the application of natural language understanding in the area of medical information systems. In a broader sense, the inventive method and system could be applied in any area in which there is a need for extracting conceptual information from free-text.

2. Description of Related Art

Medical information systems are designed to capture and manipulate large amounts of medical data. In most modem information systems this data takes the form of either free-test or coded data. Free-text is typically the information that is dictated by a caregiver and typed into a computer by a transcriptionist. It is frequently referred to as natural language data. Coded data is data that is typically entered in a structured way and stored according to a data dictionary and a pre-defined storage structure. Natural language documents can be shown on a computer screen or printed and are easily understood by humans who read them. However, the data is largely inaccessible to computer programs that manipulate medical information for research, medical decision making, quality assurance initiatives, and the management of medical enterprises. In contrast, data in coded form can be conveniently used in research, decision support, quality assurance, analyses done for management purposes and in a variety of focused reports that combine information from multiple sources, but is not readily accessible to a human reader unless translation of the coded forms and special formatting has been performed.

In order to made coded data available in a setting where a large subset of the information resides in natural language documents; a technology called natural language understanding (NLU) is required. This technology allows a computer system to "read" free-text documents, convert the language in these documents to concepts, and capture these concepts in a coded form in a medical database. NLU has been a topic of interest for many years. However, it represents one of the most difficult problems in artificial intelligence. Various approaches have been tried with varied degrees of success. Most current systems are still in the research stage, and have either limited accuracy or the capability to recognize only a very limited set of concepts.

NLU systems which have been developed for use in the field of medicine include those of Sager et al. ("Natural language processing and the representation of clinical data", JAMIA, vol. 1, pp 142–160, 1994), and Gabrielli ("Computer assisted assessment of patient care in the hospital", J. Med. Syst., vol. 12, p 135, 1989). One approach has been to made use of regularities in speech patterns to break sentences into their grammatical parts. Many of these systems work well in elucidating the syntax of sentences, but they fall short in consistently mapping the semantics of sentences.

The concepts and ultimate data base representation of the text must be derived from its semantics. Systems which rely upon the use of semantic grammars include those of Sager et al. (*Medical Language Processing: Computer Management of Narrative Data*, Addison-Wesley, Menlo Park, Calif., 1987) and Friedman et al. ("A general natural-language text processor for clinical radiology," JAMIA, vol. 1, pp. 161–174, 1994). Zingmond and Lenert have described a system which performs semantic encoding of x-ray abnormalities ("Monitoring free-text data using medical language processing", Comp. Biomed. Res., vol. 265, pp. 467–481, 1993).

A few systems have been developed which used a combination of semantic and syntactic techniques, e.g., Haug et al. (as described in "A Natural Language Understanding System Combining Syntactic and Semantic Techniques," *Eighteenth Annual Symposium on Computer Applications in Medical Care*, pp. 247–251, 1994 and "Experience with a Mixed Semantic/Syntactic Parser," *Nineteenth Annual Symposium on Computer Applications in Medical Care*, pp. 284–288, 1995) and Gunderson et al. ("Development and Evaluation of a Computerized Admission Diagnoses Encoding System," Comp. Biomed. Res, Vol. 29, pp. 351–372, 1996).

Bayesian networks, also known as causal or belief networks, are trainable systems, which have been used to apply probabilistic reasoning to a variety of problems. These networks are described in some detail in Pearl (*Probabilistic Reasoning in Intelligent Systems: Networks of Plausible Inference*, Morgan Kaufman, San Mateo, Calif., 1988) and Neopolitan (*Probabilistic Reasoning in Expert Systems*, Wiley, New York, N.Y., 1990.

All of the above references are incorporated herein by reference.

MICROFICHE APPENDIX

This specification includes a Microfiche Appendix, which includes 5 pages of microfiche with a total of 406 frames. The microfiche appendix includes computer source code of one preferred embodiment of the invention. In other embodiments of the invention, the inventive concept may be implemented in other computer code and/or languages, in computer hardware, in other circuitry, in a combination of these, or otherwise. The Microfiche Appendix is hereby incorporated by reference in its entirety and is considered to be a part of the disclosure of this specification. This Microfiche Appendix contains the material originally submitted in the provisional patent application on which this application claims priority, as such the inclusion of this Microfiche Appendix contains no new matter over the parent provisional application.

SUMMARY OF THE INVENTION

The present invention uses a probabilistic model of the meaning of medical reports to extract and encode medical concepts. It makes use of Bayesian networks to map from groups of words and phrases to concepts. This approach has the potential to bridge the gap between free-text and coded medical data and to allow computer systems to provide the advantages of both. Natural language is common in medical systems and is becoming more common. Not only is dictation and transcription widespread in medical information systems, but new technologies (e.g., computer systems that convert speech to text) are beginning to arrive that will made free-text documents easier and less expensive to produce. Accordingly, a system, which allows free-text data to be transformed to coded data, will be increasingly valuable in medical applications. The inventive system disclosed herein was developed for use in the encoding of free-text diagnoses and for the encoding of x-ray reports. However, the inventive system could also be used in legal and other fields.

It is desirable to provide a method for capturing and manipulating large amounts of medical data within medical information system databases wherein natural language free-text data is extracted and encoded to provide standardized coded data. In particular, it is desirable to provide a method and system which makes use of trainable Bayesian networks to provide accurate mapping of free-text words into a coded form. Moreover, it is desirable to provide a computer system, which is designed to efficiently, and automatically perform the method of this invention.

It is the general objective of this invention to provide a method for converting natural language free-text into encoded data for use in medical information system databases.

It is a further objective of this invention to provide a computerized method for extracting and encoding the information contained within free-text data.

It is a further objective of this invention to provide a method for encoding free-text medical information using a probabilistic Bayesian network, which can be trained to improve encoding accuracy.

It is a further objective of this invention to provide an encoding method, which is capable of accurate recognition and encoding in applications requiring the identification of a large number of concepts.

It is a further objective of this invention to provide an encoding method, which can be trained to improve its accuracy.

It is a further objective of this invention to provide a method for encoding free-text data, which employs spell checking.

It is a further objective of this invention to provide a method of encoding free-text data, which uses a synonym parser to replace words or phrases in the free-text data with equivalent expressions.

It is a further objective of this invention to provide a method of encoding free-text medical data by applying a transformational grammar.

It is a further object of this invention to provide a method for extracting and encoding medical concepts from free-text data using a probabilistic model.

These and other objectives of this invention are achieved by a method comprising the steps of receiving free-text data and other information; performing synonym checking; performing spell checking; syntactic parsing; grammar transformation; performing semantic analysis; and writing discrete concepts, as standardized medical codes, into a medical database.

In the presently preferred embodiment of the invention, the semantic parser uses a probabilistic (Bayesian) network to perform statistical pattern recognition to form mapping between terms and concepts. Improved system performance is obtained by training the Bayesian network. The inventive system has the advantage that it is capable of accurate recognition of a large number of concepts and that, once set up, its accuracy can be improved through a simple training program.

Additional detail and further developments of this invention are described in *SYMTEXT A Natural Language Understanding System for Encoding Free Text Medical Data,* by Spencer B. Koehler, one of the inventors. This document is Dr. Koehler's Ph.D. dissertation, published by the University of Utah in June of 1998. The reader should note that this dissertation was written and published after the filing date of the provisional patent application (Sep. 30, 1997) on which this patent application claims priority. This dissertation, cited on the Information Disclosure Form, is hereby incorporated by reference in this application for the material contained therein to provide additional scientific background for this invention. It is not the intent of the applicant that any additional new matter be included in this application by the incorporation of this Koehler dissertation.

DETAILED DESCRIPTION OF THE INVENTION

Source code for the software used in one of the present preferred embodiments of this invention is attached in the Microfiche Appendix. Appendix A, attached, provides a list of routines available commercially from Norsys Software Corporation and used in programming the Bayesian networks used in the preferred embodiment of this invention.

I. Overview of the System Hardware and Software Environment

Figure 1:
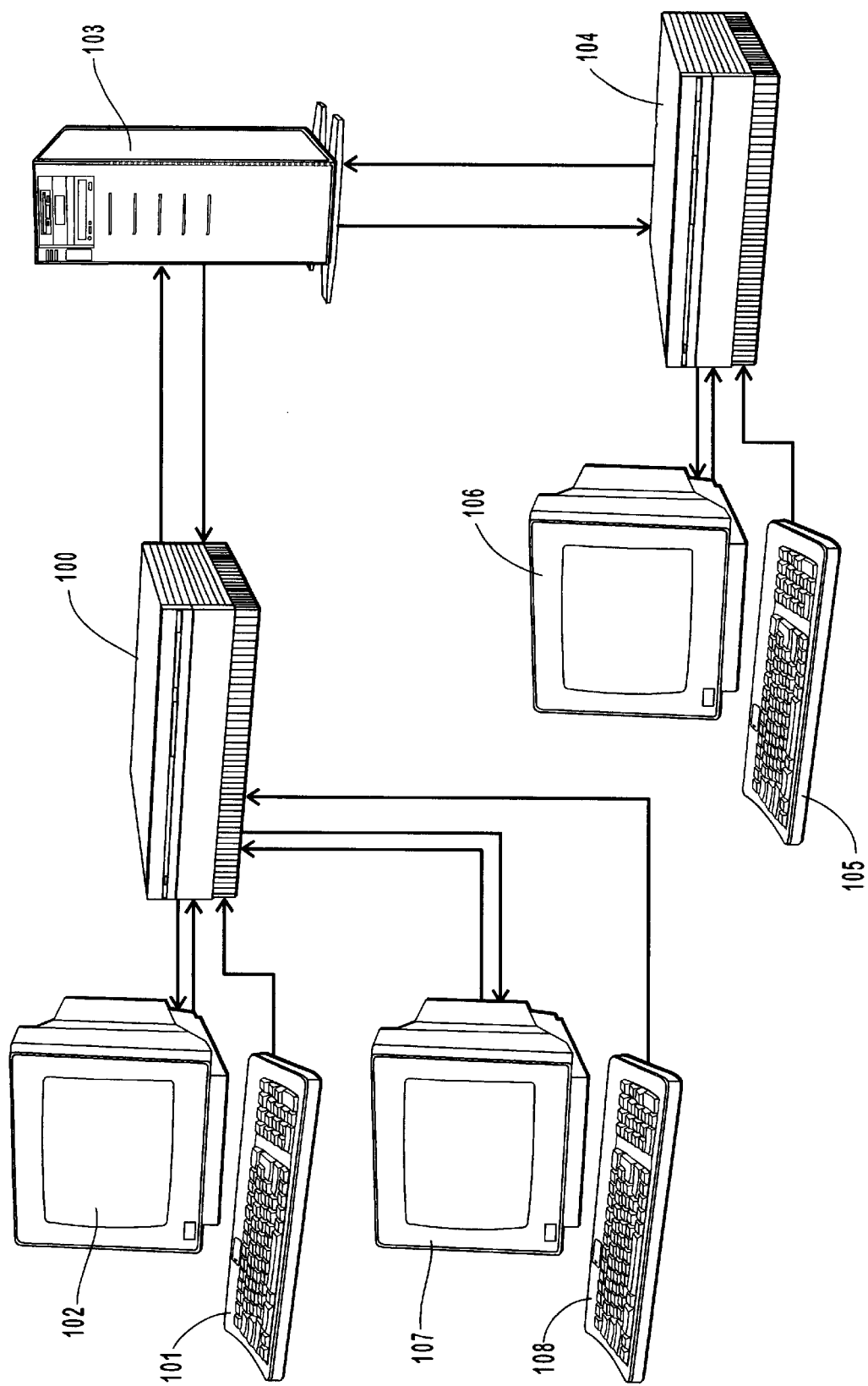
FIG. 1 is a system hardware block diagram providing a system overview.

The hardware used in one example of the preferred embodiment of the inventive system is shown in FIG. 1. In this embodiment of the invention, medical data is entered into a first computer 100 on which hospital information system software is run. Data entry is accomplished by means of keyboard 101, with text displayed on monitor 102. Medical data is stored in a database on data storage device 103. The software used for performing the natural language understanding (NLU) task of the invention is run on computer system 104, which includes a keyboard 105 and monitor 106. Computer 100 may also include one or more additional monitor 107 and keyboard 108.

In the present example of the preferred embodiment of the invention, the hospital information system running on computer 100 is the HELP system (as described in Kuperman et al., *HELP: A Dynamic Hospital Information System,* Springer-Verlag, New York, 1991) running on computer hardware from Tandem Corporation. In the present example of the preferred embodiment of the invention, computer system 104 is an Apple Macintosh computer system. The preferred model is a Power Macintosh 8100/80. This Macintosh computer has 64 megabytes of RAM and Ethernet connections to the local area network. The operating system version is Macintosh OS 7.5.1. Alternatively, any comparable computer system, which is capable of running ANSI standard common lisp environment and the tools necessary to run and query Bayesian networks, may be used. In the present example of the invention, Digitool Macintosh Common Lisp (MCL) and a Bayesian network API from Norsys Software Corporation are used.

II. Overview of the Invention Process

As patients are admitted, an entry clerk enters a free-text description of the reason for admission into the hospital information system on computer system 100 (shown in FIG. 1), as indicated by the attending physician or other care giver involved in the admitting process. The free text is a phrase or sentence made up of words related by grammar, syntax, and semantic relationships. As admit information is entered, a program trigger associated with the entry of admit information causes that text, along with other patient information (in particular, the type of patient and type of physician), to be stored to a table in a local database on data storage device 103. In the presently preferred embodiment of the invention, said database is an Oracle database; however other databases with suitable data storage and access capabilities may be used as well.

Figure 2:
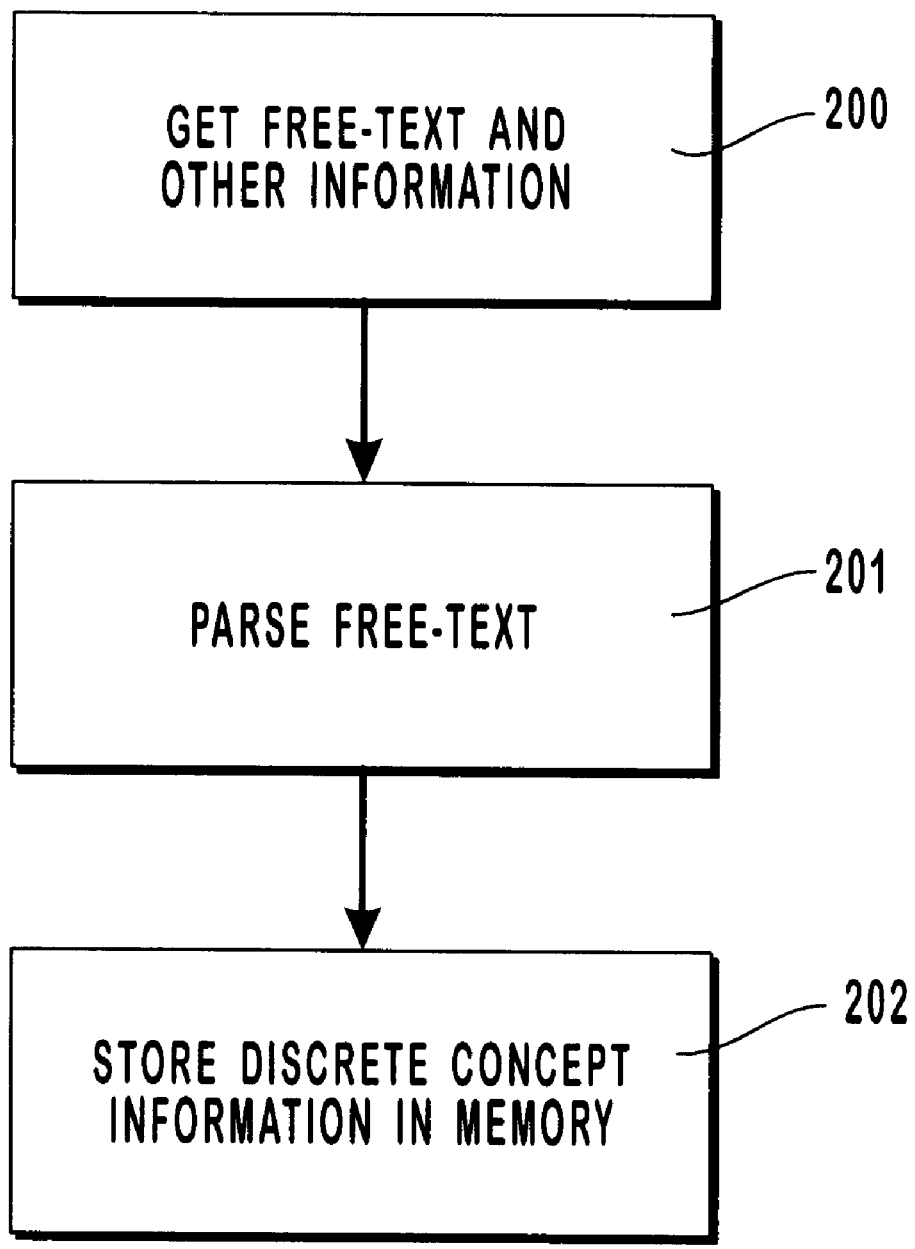
FIG. 2 is a top-level flow chart giving an overview of the inventive process.

The software process that performs the NLU task of interpreting the free-text, referred to as "admitdx" in the software provided in Appendix A, resides on a Macintosh PowerPC 8100. All interpretive processing is carried out in code written in Macintosh Common Lisp (MCL 4.0). A global view of the process of obtaining and interpreting free-text information and returning processed data is provided in FIG. 2. Generally, the steps carried out by the inventive system include obtaining free-text and other information at step 200, parsing the free text to obtain the discrete concepts contained in the free text, step 201, and storing the discrete concept information in memory, step 202, from which it can be made available for various types of further use or analysis.

The interpretive processes access and write information to the Oracle database via routines stored in the callable shared libraries "parse-oracle" and "parse-oracle-new", source for which can be found in the files "parse-oracle" and "parse-oracle-new-pc". These routines make use of an API and pre-compiler provided by Oracle corporation, called "Pro-C", to do Oracle writes and queries from user-written programs.

The top-level code for admitdx can be found in the file "parse-oracle.lisp". In that file, the routine "oracle_text_in" controls the process of retrieving text, interpreting it and storing an interpretation back to Oracle (step 200 in FIG. 2). That routine has access to the timestamp of the last record processed. It makes a call to the routine "admitdx_text_in" in the "parse_oracle" shared library, which returns the next record after the current timestamp. After all recent records have been processed, "oracle_text_in" goes to sleep for 10 minutes before checking the oracle table again.

After retrieving a record and extracting its relevant information, "oracle_text_in" calls "admission-text-out" which exists in the same file. That routine checks that the patient is of the right type, i.e., "inpatient". It then calls the process "admitdx-ling-process" which calls further routines to parse and interpret the text (step 201 of FIG. 2). The main entry point into this parse process is the routine "parse-sentence", contained in the file "parse-sentence.lisp". This routine returns a syntactic parsetree, and a complete description of the "instantiated" interpretive network the overall state of which represents the meaning of the text, and whose highest-level node (the "condition" node), represents the diagnosis.

A time-driven process running on the HELP system (source listed in the file "ADFCHPC") checks every hour for records in admitdx_parse that it hasn't seen before. It takes the patient id and interpretive ICD9 code, and writes them to the patient record on the HELP system (step 202 in FIG. 2).

Every morning, personnel in the Medical Records department get a list of patient admissions from the preceding day, along with the free-text, and the ICD9 code written out by the process just mentioned. If there are any codes that are missing or incorrect, the personnel enter the corrected codes for those admissions. As they are entered, a routine on the HELP system sensitive to the type of those corrections stores them to another table on the Oracle database, whence they can be correlated with the original record, producing a comparison of the originally generated with the user-corrected ICD9 codes. This gathering and correlating of original and corrected interpretations is done in the routines "gather_admitdx_corrections" and "admitdx_correction_in", located in the "parse_oracle_new" shared library (source code in "parse_oracle_new.pc").

At periodic intervals, these correction records can be used to create new inputs to and corrections for the interpretive belief (Bayesian) network. These records are reviewed via a tool (whose source code resides in the file "naivegui1.lisp"), which creates new training cases incorporated into the network probabilities when the network is rebuilt. Another tool, with source in "case-repair.lisp" can be used to view all the cases that have gone into training the network so far, and thus reflect all the experience and biases of the network, and to make corrections to those cases. Trained personnel making use of the tools described above perform the above tasks manually. New inputs are created and the network trained on intervals dependent on the number of new errors produced by the system and at the convenience of the personnel. Typically, new input creation and network training are performed at roughly weekly intervals.

III. Detailed Description of the Parsing Process

Figure 3:
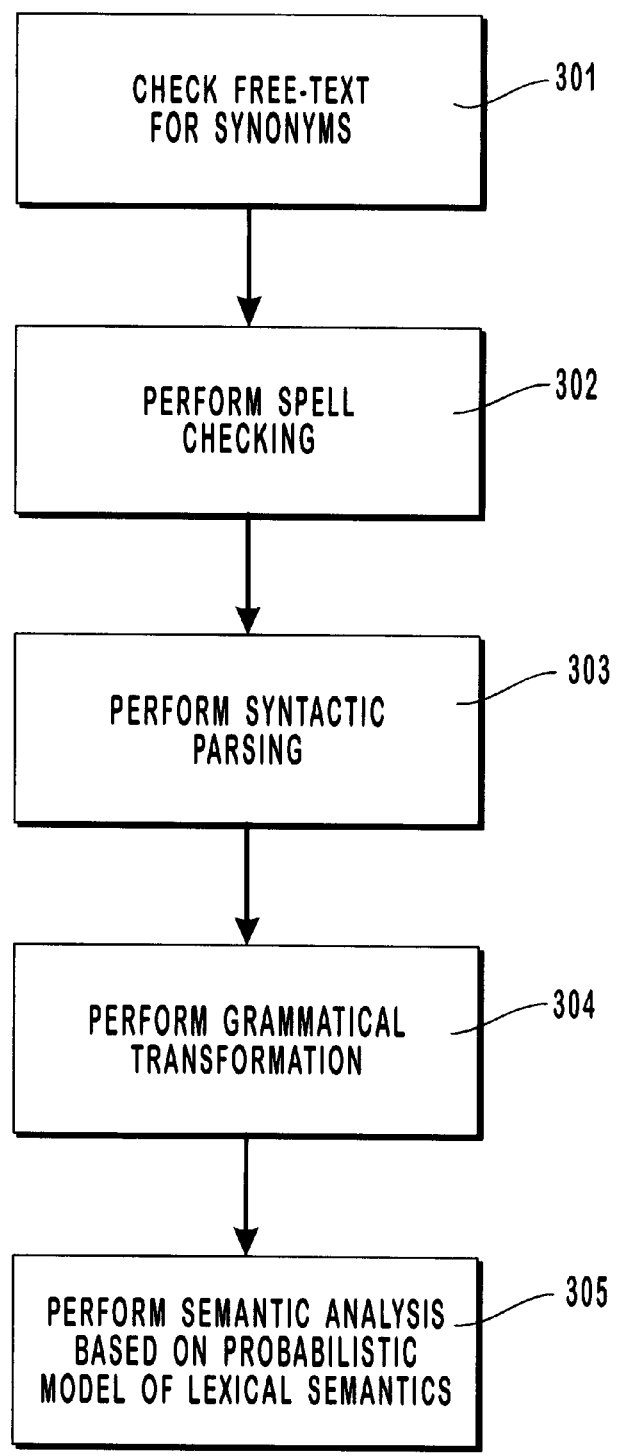
FIG. 3 is a flow chart showing the key steps of the natural language parsing portion of the invention.

As mentioned, the interpretation of the free text is carried out by the routine "parse-sentence". This routine calls a sequence of processes, as shown in FIG. 3, including (in order) a synonyms processor, semantically enhanced spellchecker, syntactic parser, transformational processor, and semantic analyzer. These are described below:

1—Synonyms: (step 301 in FIG. 3). The synonyms processor examines the input text, looking for words and phrases that might be abbreviations or variants on more standard usages, as well as common misspellings, and replaces them with the standard forms. For instance, "aaa" is a common abbreviation for "abdominal aortic aneurysm", and "a-fig" abbreviates "atrial fibrillation". Accordingly, the synonyms processor may take as its input a single word, an abbreviation, or a several-word phrase, and produces as its output a single-word or several-word phrase. The source code for the synonyms processor is in the file "synonyms.lisp"; the main function for synonym processing is "convert-synonyms".

Figure 4:
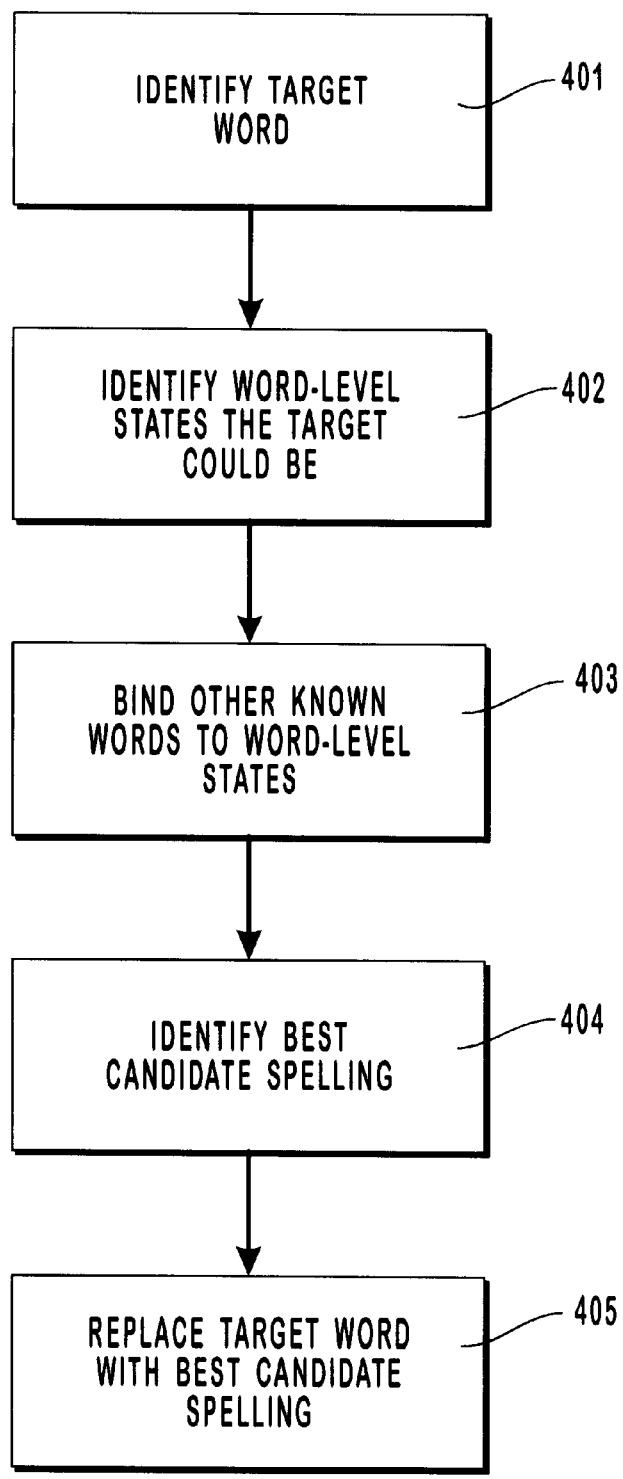
FIG. 4 is a flow chart showing the spell-checking process used in the invention.
Figure 5:
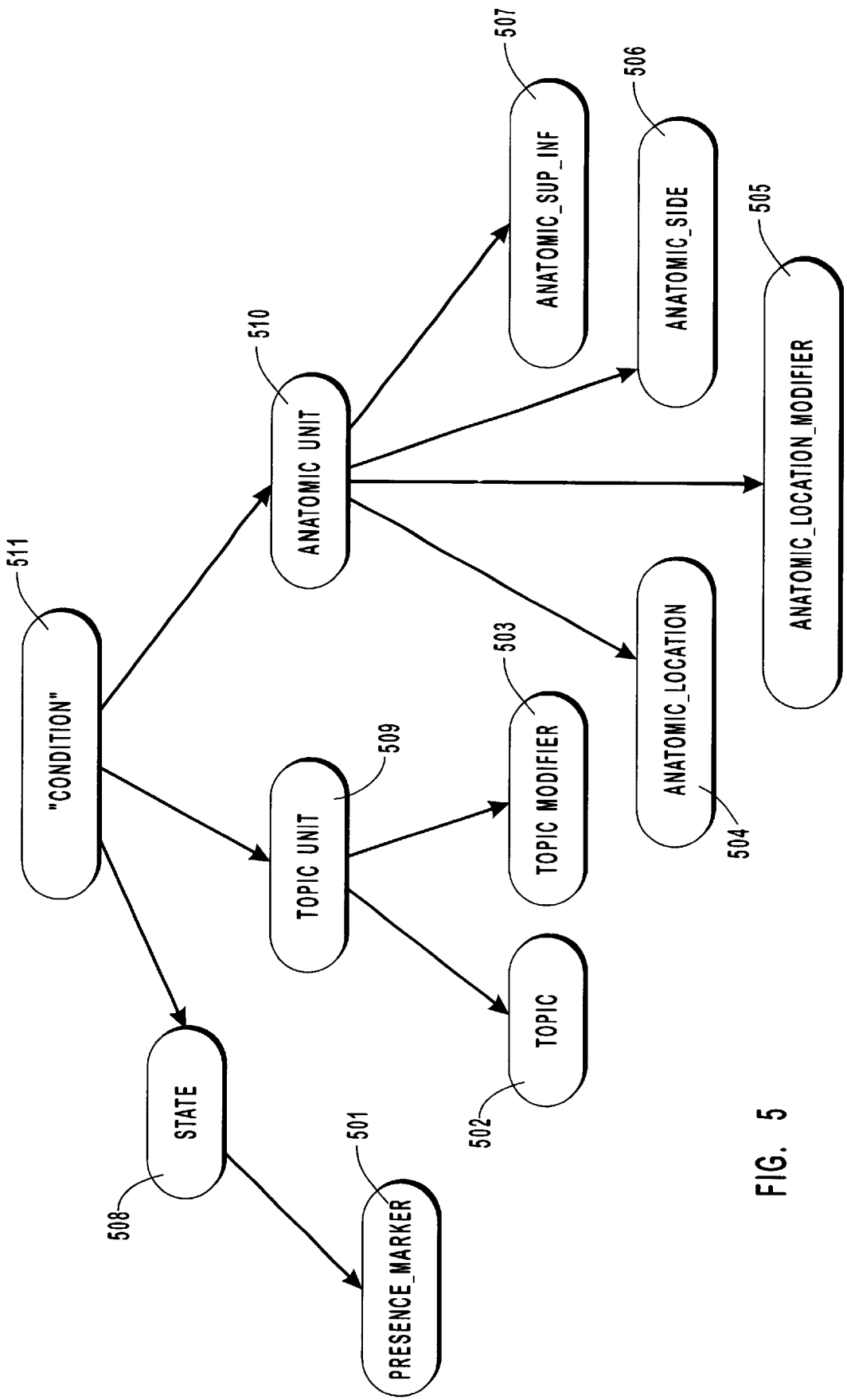
FIG. 5 shows an example of the Bayesian network used in one example embodiment of the invention.

2—Spellchecker: The source code for the spellchecker is located in "newspell.lisp". The spellchecker is represented by step 302 in FIG. 3, and is presented in more detail in FIG. 4. A target word for which spelling is checked is identified in step 401. Since only words and phrases, which are known to the interpretive Bayesian network, can be used in semantic analysis, this module attempts to determine whether the candidate word might be a misspelling of any of the known word-level node states. (The word-level is the lowest level or "leaf" level of the Bayesian network, representing words in the phrase being analyzed. The root level of the network represents the concept of the phrase. A Bayesian network is illustrated in FIG. 5). For instance, we frequently see the string "anurisum", which is a misspelling of "aneurysm".

In step 402, the spellchecker identifies a set of word-level states based on transformations of the target string into those states. For instance, "anurisum" is a misspelling of "aneurysm", given that it replaced the "eu" with "u", substituted "y" for "i", and replaced "sm" with "sum". The number and severity of the alterations required to transform one string into another provides an initial estimate of the likelihood that the one is a misspelling of the other.

Next, the spellchecker binds other known words in the sentence to word-level states in the interpretive network (step 403), and tries to identify which of the candidate spellings of the target word makes sense in the context of these words (step 404). If the network has training cases including the words "brain aneurysm", priming the network with "brain" will yield a high probability for "aneurysm", and a low probability for other candidates such as "anaphylactic". This measure of semantic coherence, along with the degree and severity of the misspelling, can be used to rank and select among various candidate spellings. Finally, the target work is replaced by the best (most probable) candidate spelling (step 405).

3—Syntactic parser (step 303 of FIG. 3). The syntactic parser used in admitdx is a fairly standard implementation of a context-free grammatical parser, with adaptations for transformations based on the notion of "movement". These ideas are described in detailed in James Allen's book "Natural Language Processing", which is incorporated herein by reference. Syntax is parsed in a manner constrained by ongoing analysis of semantic coherence of proposed syntactic relations within the parse, and of word-sense assignments to words within the parse. Source code for syntactic parsing is included in the Microfiche Appendix under the heading "syntactic parser".

4—Transformation component (step 304 of FIG. 3). This component implements the notion of a transformational grammar, as a means of determining the "deep" or semantic form of a sentence from recognizable surface characteristics. The transformation is constrained by ongoing analysis of semantic coherence of the proposed syntactic relations within the transformation. For instance, the "deep" form of "the patient is experiencing stomach pains and malaise" could be rendered "the patient is experiencing stomach pains, and the patient is experiencing malaise". The latter form groups words together in a semantically coherent way that makes the interpretation process much easier. In medical admissions, the admission text entries are typically shorthanded, abbreviated, and rarely comprise a full sentence, and such transformations are rarely needed. However, in other applications of the inventive system (e.g., analysis of X-ray images) free-text entries may be more complex and the transformational step is of greater importance for the overall accuracy of the system. The main function for the transformation is "do-all-transforms" in the file "transform.lisp".

5—Semantic analyzer (step 305 of FIG. 3). A critical feature of the present invention is that semantic analysis is performed according to a probabilistic model of lexical semantics. That is, concepts are related to words or phrases on a probabilistic basis, with the best solution being the most probable. A Bayesian network is used in the presently preferred embodiment of the invention, which allows the system to be trained from the data entered into the system. To understand the semantic analyzer, we must understand how an interpretive Bayesian network contributes to semantic analysis. A sample Bayesian network is shown in FIG. 5. Leaf-level nodes (indicated by reference numbers 501 through 507) correspond to word-level concepts; higher-level nodes (indicated at 508 through 510) correspond to higher level interpretive concepts integrating the lower concepts. The highest level node (or root node), indicated at 511, contains the broadest conceptual statement of the sentence or phrase: in the case of admit information, the condition of the patient.

Semantically significant words seen in actual reports are stored (through network training cases) as possible states of word-level nodes, and have a meaning defined by those nodes. For instance, words, such as "angina" or "lupus" will usually carry the central or "topic" meaning of phrases describing those conditions, while words such as "right" and "lower" usually play the role of modifiers to anatomic locations. Semantic analysis consists of finding the optimal (i.e., most probable) matching of words and phrases to word-level network states. This generates a set of hypotheses about the meanings of those words in the context of whole report. For instance, given the input text "unstable angina", the admitdx network would come up with the list of most-probable node/state pairs in Table 1.

TABLE 1

| NODE | STATE |
| --- | --- |
| *condition: | *intermediate coronary syndrome (unstable angina) <411.1> (0.995597) |
| *state unit: | *present (0.999887) |
| presence marker: | null (0.982195) |
| *topic unit: | *unstable angina (0.99999) |
| topic: | angina~n (1.0) |
| topic mod: | unstable~adj (1.0) |
| *anatomic unit: | *null (0.996375) |
| anat loc: | null (0.992519) |
| anat loc mod: | null (0.999435) |
| anar mod1: | null (0.992106) |
| anat mod2: | null (0.998556) |

This says, in essence, that "angina" (here restricted to be an noun) is the "topic" or essence" of the test; "unstable" is a term that modifies that topic. All other word-level nodes are slotted as "null" (meaning that the text contains no information about them). The higher-level concept "*state unit" has inferred that the condition is "resent" (as opposed to "absent", "status post" or "attempting to rule out"). The highest-probability state for the "condition" node represents the admission diagnosis. A correct diagnosis is sometimes a function not just of the literal meaning of the text, but of other factors as well, such as patient billing type and doctor type. As was noted previously, patient information regarding patient type and doctor type is collected and available with the initial admit record. For instance, given the test "failed hip replacement", patient type may determine whether the correct code should correspond to "complications of mechanical failure" or to "convalescence following surgery". There are also cases where several sentences might be entered but only the first is relevant to the diagnosis, or where the diagnosis might be a function of the separate meanings of several sentences.

The admission diagnosis (condition) can be represented as a standard ICD9 code. The ICD9 code is written to database on data storage device 103 and ultimately transferred to computer system 100. In the above example, given the input text "unstable angina", the highest probability state of the "condition" node would be the state "*intermediate coronary syndrome (unstable angina) <411.1 >". The ICD9 code for this condition is 411.1, and is embedded in the state name. This value is stored, through the routine "write_to_ admitdx_parse" (in the shared library "parse_oraclenew") to the Oracle table "admitdx_parse".

Top-level source code for the semantic analyzer is located in "parse-sentence.lisp"; the core routines are located in "backresolution.lisp". "parse-sentence" calls the synonyms module, then calls "Apply-Best-Event-Info", which first identifies which belief networks might be most apt at interpreting the text (there might be several, e.g., networks for recognizing diseases, finding, or apparatus descriptions), then calls "Get-Instantiation-ParseTree", which calls the routines which produce the syntactic parsetree and appropriate linguistic transformations. "Get-Instantiation-ParseTree" then calls "ParseTree-Semantics", located in "backresolution.lisp". Although in the example shown here a single parse tree is used, in some cases the best results may be obtained by combining several parse trees, and this capability is included in the presently preferred embodiment of the software given in the Microfiche Appendix.

Figure 6:
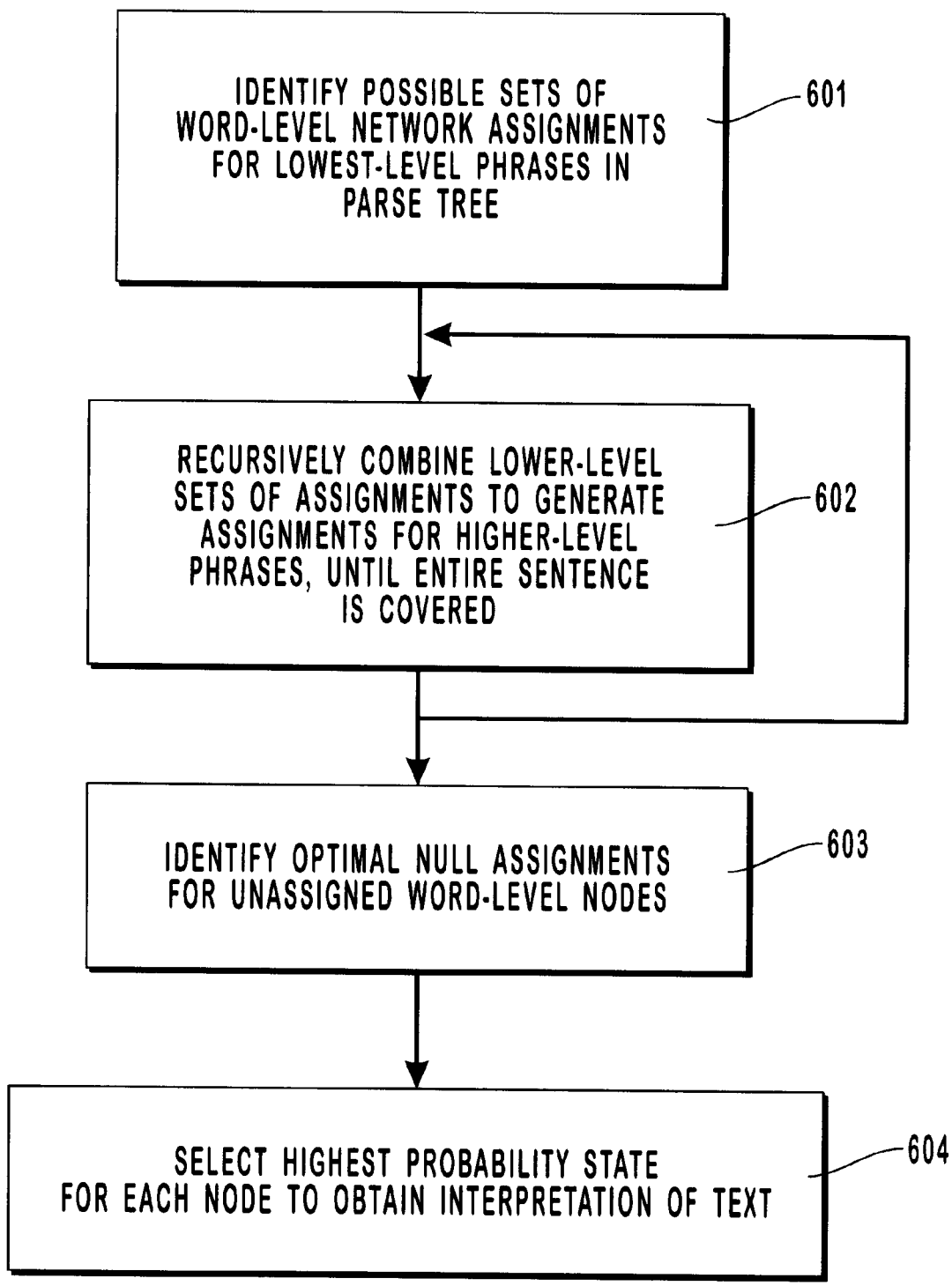
FIG. 6 is a flow chart of the semantic analyzer.

A flow diagram for the semantic analyzer is provided in FIG. 6. The semantic analyzer coded in "backresolution.lisp" "walks" the syntactic parsetree from the bottom up, finding optimal network assignments for words as it proceeds. It considers first the phrasal heads, given that heads of phrases are most likely to have a meaning central to the meaning of the overall phrase, and in terms of which the other phrase components can be best understood. (For instance, in the phrase "behind the left upper lobe", processing "left" in the context of "lobe" is more likely to lead to correct understanding of anatomic location than processing "left" with "behind"). The semantic analyzer identifies possible sets of word-level network assignments for the lowest-level phrases in the parse tree (step 601). It then recursively combines lower-level sets of assignments to generate assignments for higher level phrases, until the entire phrase or sentence has been covered (step 602). The assignments for higher level phrases, which include two or more lower-level phrases, are selected on the basis of the combined lower-level phrases, which are most probable to occur in combination. As it proceeds, the semantic analyzer also posits hypotheses about things the text does not say, by binding null states to nodes representing concepts which apparently have not been expressed (step 603). This process is guided by rules used to identify which possible node/state pairings are legal, which are consistent, which are semantically coherent and which are optimally semantically coherent. Finally, the highest probability state for each node is selected, to give the best interpretation of the text (step 604). The end result is a set of pairings of words or phrases to text-level nodes, consistent with the parse tree and with hypotheses about what has and has not been said, and yielding the most unambiguous probabilities for the network as a whole. The highest-probability state in the "condition" node represents the best interpretation of the text.

IV. Training of the Bayesian Network

Figure 7:
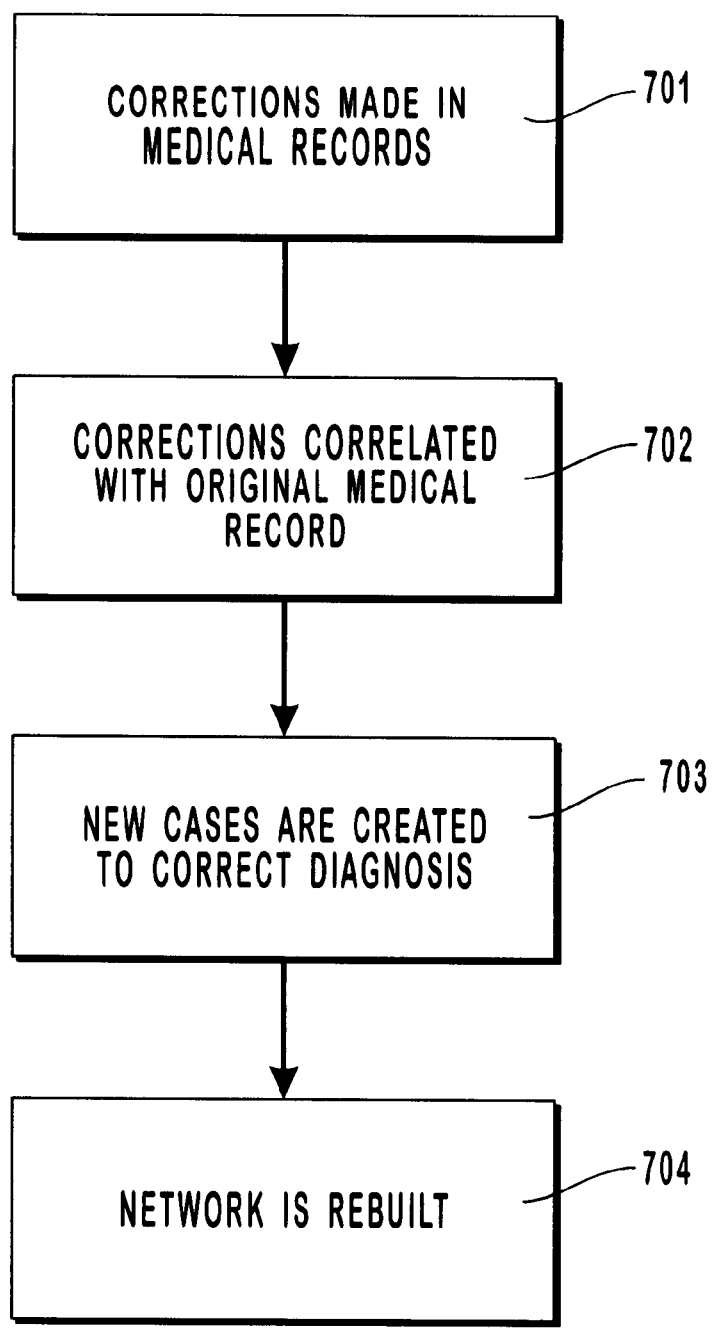
FIG. 7 is a flow chart of the process for the training knowledge base.

The steps for training the Bayesian network are shown in FIG. 7. As noted previously, the "condition" results (in the form of ICD9 codes) generated by the inventive system are assessed each day by Medical Records personnel, and correct codes are entered manually for any cases in which the system was unable to generate a code, or generated an incorrect code (step 701 in FIG. 7). As they are entered, a routine on the hospital information system running on computer system 100 recognizes corrections to the codes and stores them to a table on the Oracle database on data storage device 103. The corrected codes are then correlated with the originally generated codes (step 702). This gathering and correlating of original and corrected interpretations is done in the routines "gather_admitdx_corrections" and "admitdx_correction_in", located in the "parse_oracle_new" shared library (source code in "parse_oracle_new.pc"). At periodic intervals, the correction records are used to create new inputs to and corrections for the interpretive belief 9Bayesian) network (step 703). These records are reviewed via a tool (whose source code resides in the file "naivegui1.lisp"), which creates new training cases incorporated into the network probabilities when the network is rebuilt. Another tool, with source in "case-repair.lisp" can be used to view all the cases that have gone into training the network so far, and thus reflect all the experience and biases of the network, and to make corrections to those cases. Ultimately, the network is rebuilt using the revised training set (step 704). The steps of new case creation and network rebuilding are performed manually, by trained personnel making use of the tools described above. New inputs are created and the network trained at intervals dependent on the number of new errors produced by the system and at the convenience of the personnel. Typically, new input creation and network training are performed at roughly weekly intervals.

V. Commercially Available Code Used in Conjunction with the Main Source Code Contained in the Netica Product The inventive system uses a Bayesian network API from Norsys Software Corporation. Source Lisp code for interfacing with the Bayesian networks is located in "bn-server.lisp". The routine "belnet-interface-netica" takes a set of proposed node/state assignments and passes them to the Netica API, through a call to the routine "netica_command" in the shared library "neticalib". This shared library is written in C, and is compiled with the libraries contained in the Netica API. (A listing of function calls for the Netica API is provided in Appendix A.) After performing this instantiation, "netica_command" writes a complete snapshot of the resulting network state to a file, which is read in by "belnet-interface-netica" and interpreted by the semantic analyzer.

We claim:

1. A method for encoding free-text data, comprising:
   (A) receiving free-text data, wherein said free text data, wherein said free-text data includes: words, a grammar, a syntax and a semantic relationship between said words;
   (B) checking for synonyms of said words within said received free-text data;
   (C) checking spelling of said words within said received free-text data wherein said checking spelling further comprises:
      (1) identifying a target word within said free-text data for spell checking;
      (2) identifying a set of words known to a Bayesian network, wherein said identified set of words are those which said target word could be a misspelling, wherein said identification is based on transformations of said target word from said free-text data to create a list of candidate spellings of said target word;
      (3) binding said set of candidate spellings to said words known to said Bayesian network;
      (4) identifying a best candidate spelling from said list of candidate spelling based on probability values produced by said Bayesian network; and
      (5) replacing said target word with said best candidate spelling;
   (D) parsing said syntax of said received free-text data;
   (E) transforming said grammar of said received free-text data;

(F) analyzing said semantic relationship within said received free-text data on the basis of a probabilistic model of lexical semantics which relates said words to one or more concepts;

(G) creating an encoded representation of said received free-text data; and (H) writing said encoded representation into a medical database.

2. A method for encoding free-text data, comprising:

(A) receiving free-text data, wherein said free text data, wherein said free-text data includes: words, a grammar, a syntax and a semantic relationship between said words;

(B) checking for synonyms of said words within said received free-text data;

(C) checking spelling of said words within said received free-text data, wherein said checking spelling further comprises:

(1) identifying a target word within said free-text data for spell checking;

(2) identifying a set of words known to a Bayesian network, wherein said identified set of words are those which said target word could be a misspelling, wherein said identification is based on transformations of said target word from said free-text data to create a list of candidate spellings of said target word;

(3) binding said set of candidate spellings to said words known to said Bayesian network;

(4) identifying a best candidate spelling from said list of candidate spelling based on probability values produced by said Bayesian network, wherein said identifying a best candidate spelling employs a probabilistic analysis of said candidate spellings; and (5) replacing said target word with said best candidate spelling;

(D) parsing said syntax of said received free-text data;

(E) transforming said grammar of said received free-text data;

(F) analyzing said semantic relationship within said received free-text data on the basis of a probabilistic model of lexical semantics which relates said words to one or more concepts;

(G) creating an encoded representation of said received free-text data; and (H) writing said encoded representation into a medical database.

* * * * *